United States Patent [19]

Gerding

[11] 4,003,601

[45] Jan. 18, 1977

[54] SAFETY APPARATUS FOR HYDRAULIC VALVES IN DUMP BODY MECHANISM

[75] Inventor: Ronald B. Gerding, New Berlin, Wis.

[73] Assignee: The Heil Co., Milwaukee, Wis.

[22] Filed: Jan. 28, 1976

[21] Appl. No.: 653,171

[52] U.S. Cl. .......................... 298/22 C; 298/22 F; 298/22 P
[51] Int. Cl.² ............................................ B60P 1/28
[58] Field of Search ............. 298/22 C, 22 F, 22 J, 298/22 P, 22 B, 22 D, 22 R

[56] References Cited
UNITED STATES PATENTS

| | | | |
|---|---|---|---|
| 2,517,153 | 8/1950 | Wood | 298/22 C UX |
| 2,720,417 | 10/1955 | Kling | 298/22 C X |

*Primary Examiner*—Robert J. Spar
*Assistant Examiner*—George F. Abraham
*Attorney, Agent, or Firm*—Arthur L. Morsell, Jr.

[57] ABSTRACT

The hydraulic valve which controls the hydraulic cylinders in a dump body mechanism has its control member coupled by a cable to the dump body to automatically shift the valve from its "raise" to its "neutral" condition when the dump body reaches its uppermost position when being raised. Two lever arms are pivotally attached to the valve body adjacent to each other, the first lever arm being coupled to the valve control member and to a manual control lever, and the second lever being coupled to the dump body cable. A first abutment is attached to the second lever in position to engage the first lever to move it from its "raise" to its "neutral" position in response to movement of the second lever caused by a pull on the dump body cable. A second abutment is positioned opposite the second lever to prevent the valve control member from being moved from its "neutral" to its "lower" position in response to a pull on said dump body cable, thereby preventing accidental lowering of the dump body if a workman should bump into the cable while the dump body is raised. The two abutments do not prevent the manual control lever and first lever arm from being manually shifted in the cab from their "neutral" to their "lower" condition to initiate lowering of the dump body when desired.

14 Claims, 8 Drawing Figures

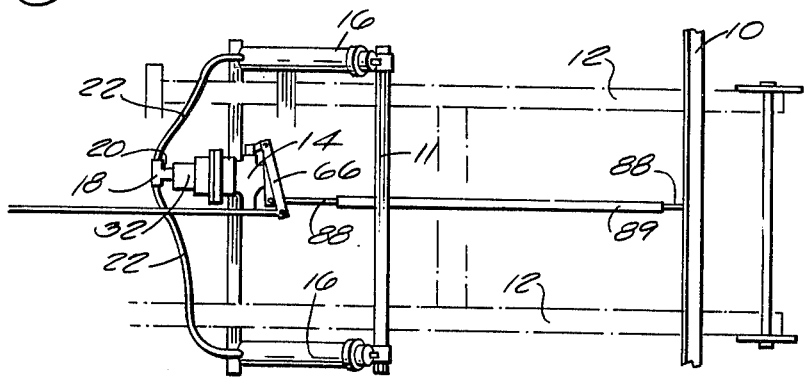
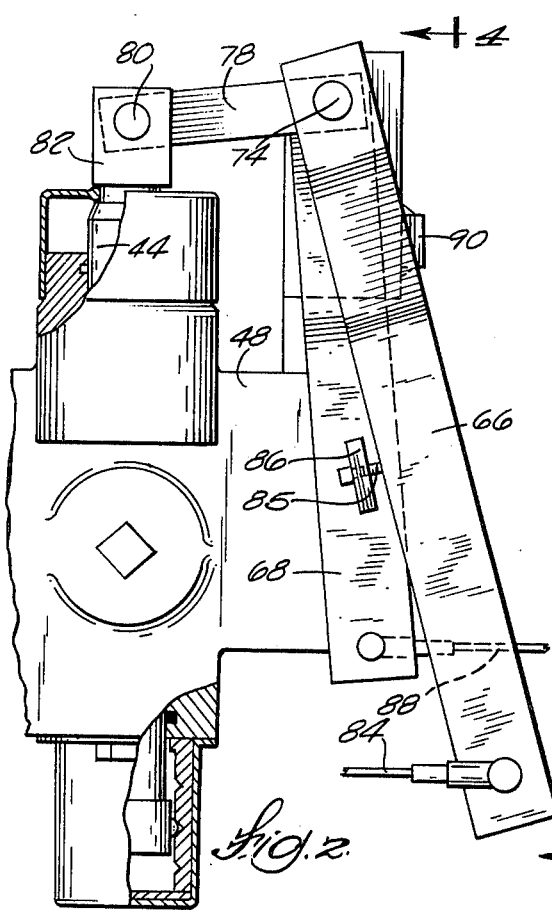
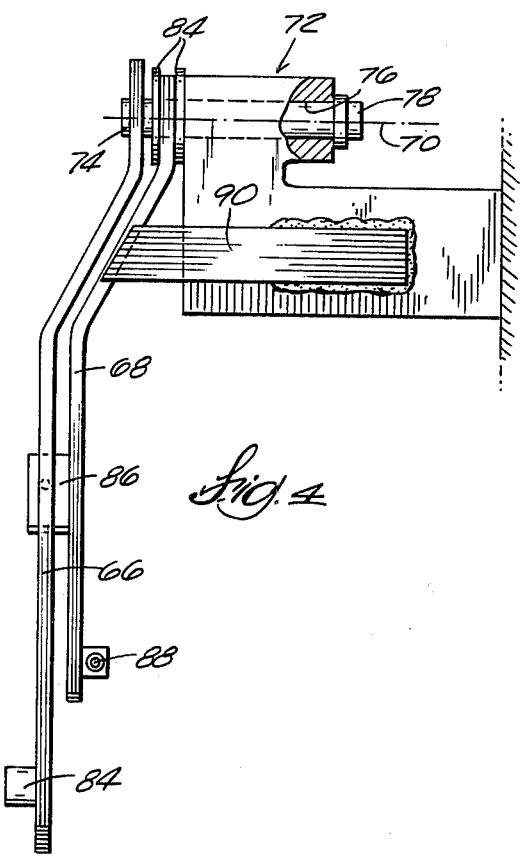
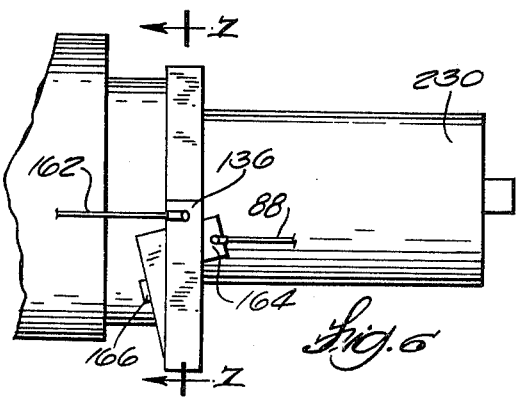

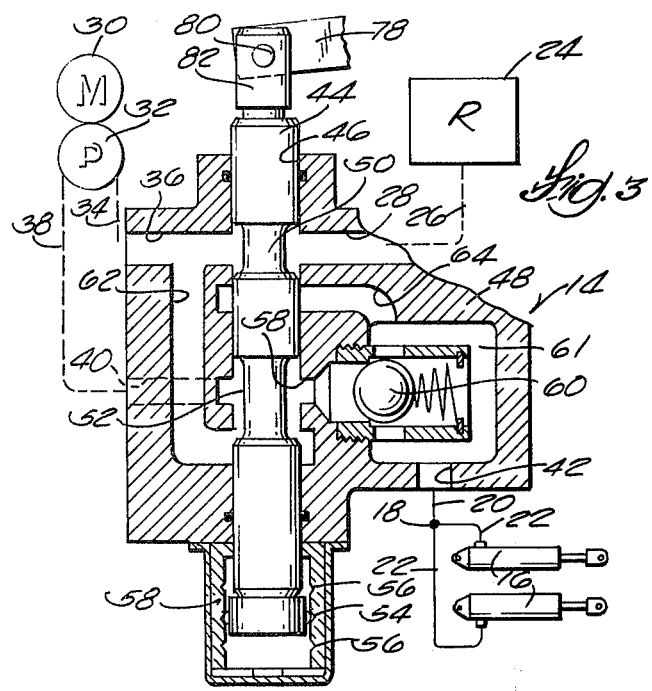
Fig. 3
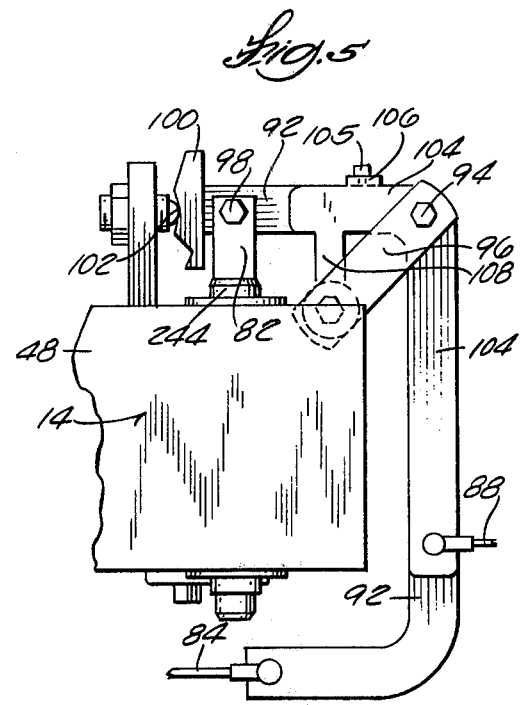
Fig. 5
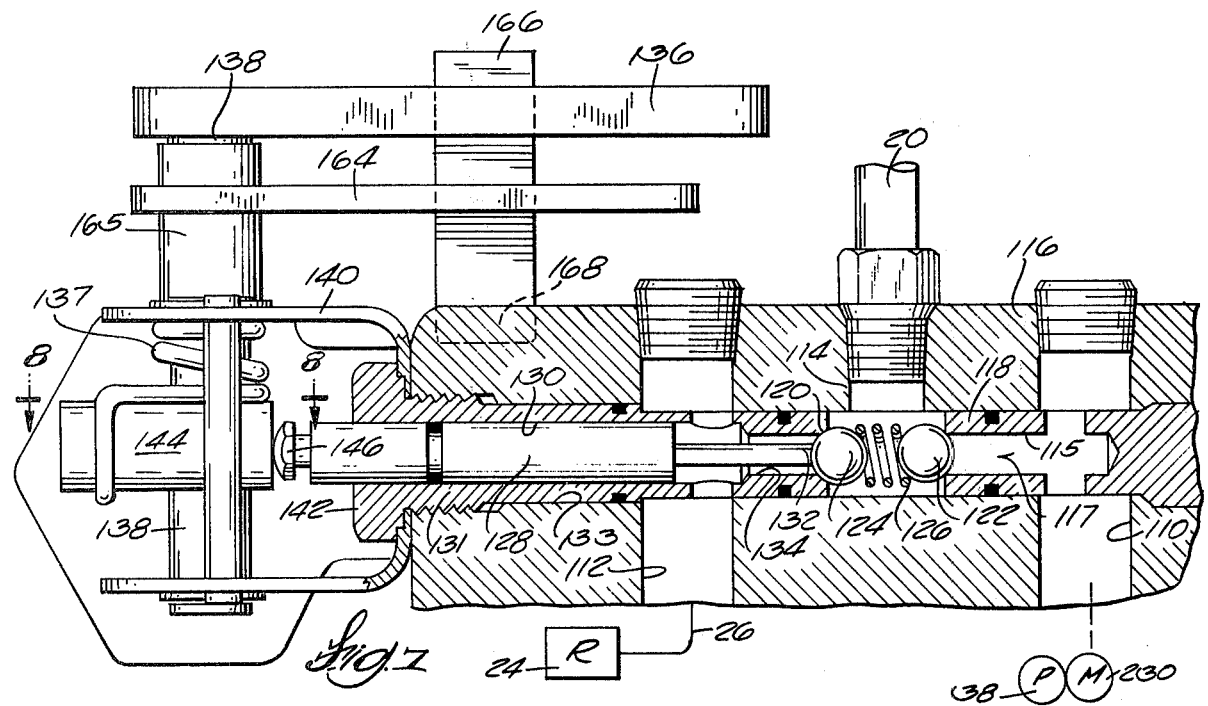
Fig. 8
Fig. 7

SAFETY APPARATUS FOR HYDRAULIC VALVES IN DUMP BODY MECHANISM

BACKGROUND OF THE INVENTION

This invention relates to safety apparatus for hydraulic valves in dump body mechanisms in which the dump body is coupled to the hydraulic valve control member by a cable to automatically move the valve control member from its "raise" to its "neutral" position when the dump body reaches its uppermost position. In such dump body mechanisms, it is possible for a workman who may be working on the dump mechanism, underneath the raised dump body, to inadvertently bump into the cable and thus initiate an unwanted lowering of the dump body by exerting a pull on the valve control member from its "neutral" to its "lower" position.

The above-noted problem has been successfully overcome by a special hydraulic valve structure which is arranged to prevent a pull on the cable from moving the valve spool from its "neutral" to its "lower" position. This special hydraulic valve structure is disclosed in co-pending U.S. Pat. application Ser. No. 572,989. This structure is suitable for only a certain type of valve.

The principal object of this invention is to solve the above-noted problem with a simple and sturdy structure which is suitable for use with other valve mechanisms than that disclosed in said co-pending patent application.

SUMMARY OF THE INVENTION

The invention is used in mechanisms including: a hydraulic circuit for a dump body mechanism, a hydraulic cylinder for raising and lowering the dump body, a hydraulic pump and a return line, and including a hydraulic valve in the circuit for controlling the flow of hydraulic fluid into and out of the hydraulic cylinder, the valve having a shiftable spool, and the hydraulic circuit having a "raise" condition in which hydraulic fluid is directed into the hydraulic cylinder to raise the dump body, having a "neutral" condition in which the hydraulic fluid is locked within the hydraulic cylinder, having a "lower" condition in which hydraulic fluid is exhausted from the hydraulic cylinder during gravity lowering of the dump body, and having force-transmitting means coupled to the dump body. The invention includes a first lever arm and a second lever arm pivotally connected to the frame, the first lever arm being coupled to the shiftable valve control member in the cab, and the second lever arm being coupled to the dump body via the force-transmitting means. A first abutment is attached to the second lever arm in position to engage the first lever arm at a predetermined point in its movement to automaticallly switch the hydraulic circuit from its "raise" to its "neutral" condition when the dump body has reached its uppermost position. A second abutment is positioned to limit further movement of the second lever arm to prevent inadvertent pressure on the force-transmitting means from shifting the hydraulic circuit from its "neutral" to its "lower" condition, the second abutment being positioned to avoid interference with the movement of the first lever arm in a lowering direction.

DESCRIPTION OF THE DRAWINGS

FIG. 1 is a fragmentary plan view of portions of a dump body frame showing an embodiment of this invention mounted thereon.

FIG. 2 is an enlarged fragmentary plan view of the hydraulic valve body and lever arms shown in FIG. 1.

FIG. 3 is a longitudinal sectional view of the hydraulic valve shown in FIGS. 1 and 2 along with a diagrammatic showing of the hydraulic circuit therefor.

FIG. 4 is a fragmentary side elevational view taken on the line 4—4 of FIG. 2.

FIG. 5 is a fragmentary plan view of a modification of the embodiment shown in FIGS. 1 - 4.

FIG. 6 is a fragmentary plan view of another modification.

FIG. 7 is an enlarged fragmentary longitudinal sectional view taken on the line 7—7 of FIG. 6.

FIG. 8 is a fragmentary detail view taken on the line 8—8 of FIG. 7.

DETAILED DESCRIPTION OF THE INVENTION

FIG. 1 is a fragmentary plan view of a portion of a dump body frame as seen from above with the dump body removed. Two dump body cross members 10 and 11 form part of a dump body which is pivotally mounted on a truck frame 12 by conventional means not shown, and is raised and lowered by a hydraulic circuit which includes a hydraulic valve 14, two hydraulic lift cylinders 16, a T-coupling 18, a hydraulic line 20 connecting valve 14 to T-coupling 18, and hydraulic lines 22 connecting T-coupling 18 to hydraulic cylinders 16. The hydraulic circuit also includes a hydraulic reservoir 24 (FIG. 3), a hydraulic return line 26 coupling reservoir 24 to port 28 of valve 14, a hydraulic pump 32 usually driven from the power takeoff, a hydraulic line 34 coupling the intake of pump 32 to port 36 of valve 14, and a hydraulic line 38 coupling the outlet of pump 38 to port 40 of valve 14 is coupled to hydraulic cylinders 16 via hydraulic lines 20, 22 and T-coupling 18.

Valve 14 has a shiftable spool 44 (FIG. 3) which is slideable in a bore 46 in the valve body 48. Spool 44 has two annular recessed portions 50 and 52 which route the hydraulic fluid between the ports of valve 14 as described hereinafter. Spool 44 has three fixed positions in which it is removably latched by spring-loaded balls 54 which engage annular grooves 56 in a collar 58 on one end of valve body 48. In FIG. 3, valve spool 44 is shown in its central or "neutral" position and can be moved upwardly in FIG. 3 to engage the uppermost groove 56, which places spool 44 in its "raise" position, or can be moved downwardly in FIG. 3 to engage the lowermost groove 56, which places spool 44 in its "lower" position.

In the "raise" position of valve spool 44, in which spool 44 is moved one notch upwardly from the position shown in FIG. 3, hydraulic fluid is pumped from pump 32 through valve port 40 and annular recess 52 to a bore 58 in which a ball check valve 60 is mounted, and then through ball check valve 60, ball check chamber 61, valve port 42, and hydraulic lines 20 and 22 to cylinders 16, thereby acting on the pistons of cylinders 16 to raise the dump body. During the raising operation, hydraulic fluid is supplied from reservoir 24 through hydraulic line 26, valve port 28, annular recess 50, valve port 36, and hydraulic line 34 to the intake side of pump 32.

In the "neutral" position of valve spool 44, in which spool 44 is in the position shown in FIG. 3, the intake and outlet of pump 32 are short circuited in a manner well known in the art. The hydraulic fluid which was previously pumped into hydraulic cylinders 16 is locked therein by ball check valve 60 and by the position of the valve member 44.

In the "lower" position of valve spool 44, in which spool 44 is moved one notch downwardly from the position shown in FIG. 3, hydraulic fluid is exhausted from hydraulic cylinders 16 through bore 64 in valve body 48, annular recess 50, port 28, and hydraulic line 26 to reservoir 24. The hydraulic pump 32 remains short circuited.

In the past, it has been the practice to connect a cable, such as the cable 88, directly to the valve spool 44 to automatically move valve spool 44 from its "raise" to its "neutral" position when the dump body reached its uppermost position. However, this cable, if advertently bumped while the dump body is in a raised position, would cause an undesired and dangerous lowering of the dump body by shifting the spool 44 from its "neutral" to its "lower" position.

The principal object of this invention is to prevent such inadvertent lowering by means of a simple and sturdy arrangement applicable to several different types of valves.

Referring to FIGS. 1–4, the structure of this embodiment includes a pair of lever arms 66 and 68 (FIGS. 2 and 4) which are pivotally mounted for independent rotation about a common axis 70 (FIG. 4) on a pivotal mounting 72 which is attached to valve body 48. The first lever arm 66 is rigidly attached at one end to a shaft 74 journalled in a bore 76 in pivotal mounting 72, and has a link 78 rigidly attached to its other end. Link 78 is pivoted at its outer end, as at 80, to the end 82 of shiftable valve spool 44. The pivotal connection between link 78 and pin 80 is loose enough to permit the slightly arcuate motion of the outer end of link 78 to be translated into linear motion of valve spool 44.

The other end of the first lever arm 66 is pivotally attached to one end of a flexible cable 84 which terminates in a conventional manual control lever (not shown) in the cab of the dump truck. This manual control lever is used to manually shift the valve spool 44 between its three positions described above, i.e. "raise", "neutral", and "lower".

The second lever arm 68 is loosely pivoted on shaft 74 between two flat washers 84 (FIG. 4), and carries an abutment 86 having an adjustment screw 85 which is positioned to be adjustably engageable with the first lever arm 66. The outer end of lever arm 68 is attached to one end of a flexible cable 88, the latter extending from lever arm 68 to cross member 10 (FIG. 1) of the dump body. The major portion of cable 58 passes through a rigid protective conduit 89. When the dump body reaches its uppermost position, cable 88 exerts a pull on the second lever arm 68 and causes it to rotate counter-clockwise in FIG. 2 until abutment 86 engages first lever 66 and causes it to rotate counter-clockwise in FIG. 2 to shift valve spool 44 from its "raise" to its "neutral" position, thereby terminating the raising of the dump body.

A second abutment 90 from mounting 72 of the valve housing and limits counter-clockwise rotation of lever arm 68 (FIG. 2) but does not limit counter-clockwise rotation of lever arm 66. Abutment 90 eliminates the possibility of an inadvertent pressure on cable 88 moving valve spool 44 from its "neutral" position to its "lower" position. Nevertheless, normal shifting of valve spool 44 from the cab through lever arm 66 is still permitted. This is due to the fact that lever 66 is free to rotate counter-clockwise in FIG. 2 past abutment 90, as shown in FIG. 2, because said abutment terminates short of lever 66 as shown in FIG. 4.

When lever arm 66 is rotated clockwise in FIG. 2 to move valve spool 44 from its "neutral" to its "raise" position, lever arm 68 moves with lever arm 66 because of abutment 86. This brings lever arm 68 back to an initial position where it is again ready to swing lever arm 66 in a counter-clockwise direction, as shown in FIG. 2, in response to a pull on cable 88 after the dump body has reached its uppermost position during raising.

FIG. 5 shows a modification of the embodiment shown in FIGS. 2 and 4, suitable for use with a different style of valve. In this modification, a first lever arm 92 which is C-shaped is pivotally attached as at 94 to a bracket 96 projecting from valve body 48. The lower end of lever arm 92 in FIG. 5 is attached to one end of cable 84 which extends from the manual control (not shown) in the cab of the dump truck. The upper end of lever arm 92, in FIG. 5, is pivoted as at 98 to the end portion 82 of shiftable valve spool 244, which corresponds to spool 44 of the form of the invention of FIGS. 1 and 3. The extreme end of lever arm 92 is also rigidly connected to a recessed indexing member 100 which interacts with a spring loaded detent 102 to hold valve spool 44 releasably latched in any one of its three positions described above. The central or "neutral" position is shown in FIG. 5. Clockwise rotation of lever arm 92 in FIG. 4 moves valve spool 44 to the "raise" position while counter-clockwise rotation of lever arm 92 moves valve spool 44 to the "lower" position.

A second lever arm 104 is also pivoted to bracket 96 at 94. Lever arm 104 is L-shaped and is connected to one end of cable 88 as shown in FIG. 5. An abutment 106 is rigidly attached to the opposite end of lever arm 104 and carries an adjustment screw 105 which is positioned to adjustably engage lever arm 92. Abutment 106 serves the same purpose as abutment 86 in the previously described form of the invention, i.e. it automatically moves valve spool 44 from its "raise" position to its "neutral" position when the dump body has reached its uppermost position.

Movement of lever arm 104 in a counter-clockwise direction in FIG. 5 is limited by a second abutment 108 which is attached to lever arm 104 on the opposite side from abutment 106 and which is adapted to engage a bumper on valve body 48 to prevent an inadvertent pull on cable 88 from shifting valve spool 44 from its "neutral" to its "lower" position. Abutment 108 serves the same purpose as abutment 90 in FIG. 4 and is dimensioned so that it does not interfere with movement of lever 92 toward lowering when cable 84 is actuated from the cab.

FIGS. 6–8 show another modification of the invention that is suitable for still another style of valve structure. Referring to FIG. 7, this valve has a first port 110 which is coupled to hydraulic pump 32 via hydraulic line 38, a second port 112 which is coupled to hydraulic reservoir 24 via hydraulic line 26, and a third port 114 which is coupled to hydraulic cylinders 16 (FIG. 3) via hydraulic line 20. When electric motor 230 (FIG. 6) is switched on, it drives hydraulic pump 38 (FIG. 7) and supplies hydraulic fluid under pressure to port 110. The hydraulic fluid is directed via a bore 115 in valve body 116 to one side of a double acting check valve 117 comprising a pair of opposed check valve seats 118 and 120, a pair of ball valve elements 112 and 124, and a compression spring 126 which urges both balls against the corresponding valve seats 118 and 120. The pressure applied to the hydraulic fluid in port 110 and bore 115 displaces ball 122 off of its seat 118 and permits hydraulic fluid to flow through the check valve and through port 114 and hydraulic line 20 to hydraulic cylinders 16 (FIG. 1) to raise the dump body. When the dump body has reached its uppermost position, electric motor 230 is switched off by means described hereinafter. The hydraulic fluid which was previously pumped into cylinders 16 is then locked in cylinders 16 by the double acting check valve 117 in response to the hydraulic pressure developed in port 114 by the downward pull of gravity on the raised dump body.

To lower the dump body, ball 124 is moved off of its valve seat 120 by a shiftable valve control member such as push rod 128 which is slideably mounted within a bore 130 in a sleeve 131, which in turn is seated in a bore 133 in the valve body 116. Push rod 128 has an inner end portion 132 which is reduced in diameter and extends through the bore 134 that links valve seat 120 to port 112. When push rod 128 is moved inwardly, by cam means described hereinafter, its end portion 132 displaces ball 124 off valve seat 120 and allows hydraulic fluid to flow from port 114 to hydraulic reservoir 24 through bore 134 and port 112. This allows the dump body to lower under the influence of gravity, as long as ball 124 is held off of its valve seat 120. The lowering process ceases when the inward pressure on push rod 128 is released, thereby allowing spring 126 and the gravity-induced hydraulic pressure in port 114 to reseat ball 124 against valve seat 120.

The above described shifting action is accomplished by means of a lever arm 136 (FIGS. 6 and 7) which is rigidly attached at one end to a transverse shaft 138 (FIG. 7), the latter being pivoted on a bracket 140 attached to valve body 116 by the enlarged head 142 of sleeve 131. A cam 144 is rigidly attached to shaft 138 to coact with an adjustable cam follower screw 146 on push rod 128. Cam 144 has a high portion 150 (FIG. 8) which is positioned to act on cam follower 146 and move push rod 128 inwardly when shaft 138 is rocked counter-clockwise in FIG. 8 to cause the lowering action described above. Cam follower screw 146 is threaded into the end of push rod 128 and is hex-headed to permit adjustment of the dump body lowering speed.

Cam 144 also has a portion 152 (see FIG. 8) positioned to act on the actuating button 154 of a microswitch 160 which is mounted by conventional means not shown opposite cam 144 and which is coupled by conventional electrical circuit means (not shown) to start motor 230 when button 154 is depressed and to stop motor 230 when button 154 is released. When shaft 138 is rocked in a clockwise direction in FIG. 8, it depresses button 154, and when shaft 138 is rocked in a counter-clockwise direction in FIG. 8, it releases button 154. Shaft 138 is rocked by lever arm 136, which in turn is connected by a cable 162 (FIG. 6) with a conventional manual control in the cab (not shown). The position of parts shown in FIGS. 7 and 8 correspond to the "neutral" position, and spring 137 tends to urge the parts back to "neutral".

To shift to the "raise" position, shaft 138 is rocked clockwise in FIG. 8 until switch button 154 is depressed sufficiently to operate switch 160 and turn motor 230 on. To return to the "neutral" position, shaft 138 is rocked counter-clockwise in FIG. 8 back to the position there shown to release the pressure on switch button 154. To shift to the "lower" position, shaft 138 is rocked counter-clockwise in FIG. 8 until cam surface 150 moves push rod 128 to the right in FIG. 7 to move valve ball 124 off valve seat 120.

A second lever arm 164 (FIGS. 6 and 7) is pivotally mounted on shaft 138 through a sleeve 165 (FIG. 7) which is loosely fitted over a portion of shaft 138 and rotates freely thereover. Lever arm 164 is substantially L-shaped (FIG. 6) and is attached by conventional means to cable 88 which is attached to the cross-member 10 of the dump body. An abutment 166 is rigidly attached to lever arm 164 and has one end projecting past lever arm 136 (FIG. 7) and the opposite end projecting to a position to engage a portion of valve body 116 as at 168. Abutment 166 is so positioned as to engage lever arm 136 to move it from its "raise" to its "neutral" position in response to a pull on cable 88 when the dump body has reached its uppermost position during raising. Further movement of lever arm 164 is prevented by engagement of abutment 166 with portion 168 (FIG. 7) of valve body 116, thus preventing movement of lever arm 164 beyond its "neutral" position and preventing inadvertent lowering of the dump body. This is done without blocking movement of lever arm 136 from the "neutral" to the "lower" position in response to manual actuation of cable 162 from the cab. Thus an inadvertent pull on cable 88 cannot rock shaft 138 from its "neutral" to its "lower" position, and thus the valve body portion 168 serves the same function as abutment 90 in FIGS. 2 and 4 and the same function as abutment 108 in FIG. 5.

Various changes and modifications may be made without departing from the spirit of the invention, and all of such changes are contemplated as may come within the scope of the claims.

What I claim is:

1. In a dump body mechanism having a frame, having a tiltable dump body mounted thereon, and having means including a hydraulic cylinder for raising and lowering the body, there being a hydraulic circuit for said cylinder including a hydraulic pump and a return line, and there being a valve in said circuit for controlling the flow of hydraulic fluid into and out of said hydraulic cylinder, said valve including a valve body and a shiftable control member, and said hydraulic circuit having a "raise" condition in which hydraulic fluid is directed into said hydraulic cylinder to raise the dump body, having a "neutral" condition in which the hydraulic fluid is locked within said hydraulic cylinder, and having a "lower" condition for exhausting hydraulic fluid from said hydraulic cylinder to said return line during gravity lowering of the body, and there being an elongated force-transmitting member connected at one end to said dump body, the improvement comprising first and second lever arms pivotally mounted adjacent to said shiftable valve control member, manually operable means connected to said first lever arm, and said second lever arm being connected to said dump body through said elongated force-transmitting member, a first abutment means on said second lever arm positioned to engage said first lever arm after said second lever arm has been pivotally moved a predetermined distance to automatically switch said hydraulic circuit from its "raise" condition to its "neutral" condition after said dump body has reached its uppermost position, and second abutment means positioned to limit further movement of said second lever arm whereby an inadvertent force on said elongated force-transmitting member will not cause unexpected lowering of the dump body, said second abutment means being positioned to avoid interference with the movement of said first lever arm in a dump body lowering direction.

2. The dump body mechanism of claim 1 wherein said second abutment means is also carried by said second lever arm and is positioned to engage the valve body in limiting further movement of said second lever arm.

3. The dump body mechanism of claim 2 wherein said second abutment means is on an opposite side of said second lever arm from said first abutment means.

4. The dump body mechanism of claim 1 in which said first lever arm is C-shaped to embrace said valve body, and in which the second lever arm is L-shaped.

5. The dump body mechanism of claim 1 wherein said first and second lever arms are mounted for rocking about a common axis.

6. The dump body mechanism of claim 1 in which the shiftable control member is a valve spool.

7. The dump body mechanism of claim 1 wherein said second abutment means includes a portion of said valve body.

8. The dump body mechanism of claim 1 wherein said second abutment means comprises a projection from said valve body, which projection is positioned to be engaged by said second lever to limit the movement thereof, said projection being sufficiently short that it does not interfere with movement of said first lever arm.

9. The dump body mechanism of claim 1 and also including an electric motor for driving said hydraulic pump and an electric switch with a momentary contact switch element for controlling the operation of said motor, and further comprising a cam operatively connected to said first lever arm having a portion positioned and shaped to depress said momentary contact switch element when the first lever arm is in one position of movement and to release said momentary contact switch element when the first lever arm is in a second position of movement, and said lever arm having a portion shaped and positioned to move said shiftable valve control member from its "neutral" to its "lower" position when said first lever arm is moved from its second position to a third position.

10. The dump body mechanism of claim 9 wherein there is a rock shaft journaled to said valve housing, wherein said lever arm is rigidly attached to said rock shaft, and wherein said cam is rigidly attached to said shaft to rock therewith.

11. The dump body mechanism of claim 9 wherein said hydraulic valve includes a double ball check valve mechanism having two valve balls, and wherein said shiftable control member is movable to a position to displace one of said ball valves off of its valve seat, and further comprising a cam follower attached to the outer end of said shiftable valve control member in position to be acted on by said cam.

12. The dump body mechanism of claim 11 wherein said cam follower comprises the head of an adjustable screw.

13. The dump body mechanism of claim 1 and also including an indexing member attached to said first lever arm, and a spring loaded detent positioned for coaction with said indexing member, said indexing member having recesses to releasably and selectively lock said first lever arm in its "raise", "neutral", or "lower" position.

14. The dump body mechanism of claim 1 in which the engagement between the first abutment means on the second lever arm with the first lever arm is by way of an adjustment screw.

* * * * *